(12) United States Patent
Lee et al.

(10) Patent No.: US 7,286,862 B2
(45) Date of Patent: Oct. 23, 2007

(54) AUTOMATIC/MANUAL SLIDE TYPE COMMUNICATION TERMINAL

(75) Inventors: Ki Young Lee, Kyungki-do (KR); Chang Hun Park, Kyungki-do (KR); Tae Ho Yun, Kyungki-do (KR)

(73) Assignee: Samsung Electro-Machanics Co., Ltd., Kyungki-Do (KR)

( * ) Notice: Subject to any disclaimer, the term of this patent is extended or adjusted under 35 U.S.C. 154(b) by 467 days.

(21) Appl. No.: 10/998,934

(22) Filed: Nov. 30, 2004

(65) Prior Publication Data

US 2006/0068859 A1    Mar. 30, 2006

(30) Foreign Application Priority Data

Sep. 2, 2004    (KR) .................... 10-2004-0069986

(51) Int. Cl.
*H04M 1/00* (2006.01)
(52) U.S. Cl. ................ 455/575.4; 455/550.1; 455/575.1; 379/433.12; 379/433.13
(58) Field of Classification Search ............ 455/550.1, 455/572, 575.1, 575.4; 379/433.12, 433.13
See application file for complete search history.

(56) References Cited

U.S. PATENT DOCUMENTS

| | | | | |
|---|---|---|---|---|
| 5,151,946 A | * | 9/1992 | Martensson | 455/575.4 |
| 5,659,307 A | * | 8/1997 | Karidis et al. | 341/22 |
| 6,993,128 B2 | * | 1/2006 | Eromäki | 379/433.12 |
| 7,003,104 B2 | * | 2/2006 | Lee | 379/433.13 |
| 7,136,688 B2 | * | 11/2006 | Jung et al. | 455/575.4 |
| 2001/0009847 A1 | * | 7/2001 | Kim et al. | 455/90 |
| 2002/0025787 A1 | | 2/2002 | Lee | |
| 2003/0003962 A1 | | 1/2003 | Vooi-Kia et al. | |
| 2003/0174240 A1 | * | 9/2003 | Wada et al. | 348/374 |
| 2005/0288076 A1 | * | 12/2005 | Seol | 455/575.4 |

(Continued)

FOREIGN PATENT DOCUMENTS

DE    102 61 218    2/2004

(Continued)

OTHER PUBLICATIONS

German Patent Office, Office Action mailed Jun. 30, 2006.

(Continued)

*Primary Examiner*—Edan Orgad
*Assistant Examiner*—Junpeng Chen
(74) *Attorney, Agent, or Firm*—Lowe Hauptman Ham & Berner

(57) ABSTRACT

A slide type communication terminal designed to allow a sliding operation to be smoothly completed by means of a driving unit and a travel-enlarging member. In the communication terminal having a first body and a second body, a driving unit includes a motor and a pinion connected to the motor. A first hinge has a rack gear meshed with the pinion and a travel-enlarging member connected to the rack gear. A second hinge has a contact member protruded therefrom to contact the travel-enlarging member. Rotation of the pinion in response to the drive force of the driving unit is converted into a linear movement of the rack gear, and a distance of the linear movement of the rack gear is enlarged by means of the travel-enlarging member, so that the second body fixed to the second hinge is slid to an enlarged travel distance.

19 Claims, 11 Drawing Sheets

U.S. PATENT DOCUMENTS

2006/0176654 A1* 8/2006 Kfoury .................... 361/681
2007/0032278 A1* 2/2007 Lee et al. ................ 455/575.4

FOREIGN PATENT DOCUMENTS

| DE | 103 48 000 | 10/2004 |
| DE | 10 2004 027 606 | 11/2005 |
| DE | 10 2004 051 480 | 1/2006 |
| EP | 0 414 365 | 2/1991 |
| EP | 1 148 692 | 10/2001 |
| EP | 1 182 849 | 2/2002 |
| JP | 10-020050 A | 1/1998 |
| JP | 2003/032335 A | 1/2003 |
| JP | 2004-60883 A | 2/2004 |
| WO | 94/015117 | 7/1994 |

OTHER PUBLICATIONS

Japanese Patent Office, Office Action mailed Apr. 3, 2007 and English Translation.

* cited by examiner (a)          (b)

(a)

(b)

(a)

(b)

AUTOMATIC/MANUAL SLIDE TYPE COMMUNICATION TERMINAL

RELATED APPLICATION

The present application is based on, and claims priority from, Korean Application Number 2004-0069986, filed Sep. 2, 2004, the disclosure of which is hereby incorporated by reference herein in its entirety.

BACKGROUND OF THE INVENTION

1. Field of the Invention

The present invention relates to an automatic/manual slide type communication terminal, and more particularly to a slide type communication terminal having a travel-enlarging member in order to be smoothly completed a sliding operation.

2. Description of the Related Art

Generally, slide-type communication terminals have upper and lower bodies, which can be overlapped with each other, and a slide structure to allow the upper and lower bodies to be slid with respect to each other, thereby opening or closing a predetermined region of the terminal.

Such a slide type communication terminal has a guide member fixed to one side of the terminal to guide a sliding movement of the upper or lower body, and a sliding module comprising a slider fixed to the other side opposite to the one side to which the guide member is fixed, to slidably reciprocate along the guide member.

For instance, in the case where the upper body is provided at the rear side thereof with the guide member, the slider is coupled to one side of the front surface of the lower body, and slidably reciprocates along with the lower body contacting the guide member.

FIG. 1 shows the rear side of a conventional slide type communication terminal, which will be described as follows.

The conventional slide type communication terminal comprises an upper body 10 having a display screen (not shown) provided at the front side of the upper body, and a lower body 20 having a battery pack coupled to the rear side of the lower body, such that the upper and lower bodies 10 and 20 are overlapped in parallel to each other and slidably reciprocate to open or close a predetermined region of the terminal. The conventional slide type communication terminal comprises guide slits 11 provided at the rear side of the upper body 10, each of which has a guide member (not shown) therein to guide a sliding movement, and sliders reciprocating along the guide members while sliding together with the lower body 20.

However, since the sliders of such a conventional manual slide-type module must be completely slid to the end in order to open or close a predetermined region of the terminal, there is a problem in that it is relatively difficult to open or close the predetermined region of the terminal, for instance, it is not easy to open or close the terminal with one hand, compared with a folder type communication terminal.

In order to solve the problem, there is a need to provide a slide type communication terminal designed to allow easy manual sliding operation.

FIG. 2 is a schematic view illustrating a conventional slide type communication terminal designed to allow the sliding operation to be completed by virtue of an elastic force of an elastic member when a stroke of a half or more is applied to the elastic member.

Referring to FIG. 2, the slide type communication terminal comprises a first hinge 50, a second hinge 30, and an elastic member 40. The first hinge 50 is fixed to a lower portion of a main part, not shown, and the second hinge 30 is fixed to an upper portion of a sliding part, not shown. The first and second hinges 50 and 30 are connected to each other by means of guide grooves 36 and guide flanges 56, allowing the sliding operation.

The elastic member 40 comprises a torsion spring 42 and a fastening screw 44. The torsion spring 42 has one side fixed to a fixing groove 37 of the second hinge 36, and the other side fixed to the first hinge 50 by means of the fastening screw 44.

That is, the torsion spring 42 is fixed to the first member 50 and to the fixing groove 37, thereby providing the elastic forces in opposite directions to the first and second hinges 50 and 30 centering on a predetermined conversion point.

Operation of the slide-type communication terminal constructed as described above will be described as follows.

When the sliding part (not shown) is pushed to open a predetermined region of the terminal from a closed state, the second hinge 30 starts to move from an initial state. Then, when the sliding part is pushed to a point after passing the predetermined conversion point where the elastic force reaches a maximum elastic force, the second hinge 30 is completely moved in a direction that the predetermined region of the terminal is opened by virtue of the elastic force generated from the torsion spring 42.

With such a conventional slide type communication terminal, although the sliding part can be manually operated, there is a problem in that it cannot be automatically operated.

FIG. 3 is a schematic diagram illustrating the rear side of the conventional slide type communication terminal, which can manually and automatically realize an opening/closing operation of the slide type communication terminal.

The slide type communication terminal shown in FIG. 3 comprises a first body 70, a second body 40, a pinion gear 75 mounted on one end of the second body 70, a rack gear 61 mounted on one side of the first gear 60 in a longitudinal direction to mesh with the pinion gear 75, a drive motor (not shown) mounted on the second body 70 to supply a drive force, a power transmission part 80 to transmit the drive force of the driving motor to the pinion gear 75, and a control switch 62 to control operation of the drive force.

In the slide type communication terminal, when the driving motor is operated using the control switch with the second body 70 closed, a rotational force of the driving motor is transmitted to the pinion gear 75 through the power transmission part, rotating the pinion gear 75, and the rack gear 61 meshed with the pinion gear 75 is moved, allowing the first body 60 to move upwardly, resulting in an opening of the first body 60.

As such, an automatic sliding operation of the conventional slide type communication terminal can be simply realized using the pinion gear 75 and the rack gear 61. However, when realizing a manual sliding operation of the conventional slide type communication terminal, there are problems in that, as with the conventional manual slide type communication terminal, it is difficult to open or close the predetermined region of the terminal with one hand, and in that it is difficult to completely open or close the predetermined region of the terminal by one time application of external force.

To illustrate, let D be a diameter of the pinion gear 75, a stoke S moved by a rotation of the pinion gear 75 is $\pi \times D$. Accordingly, in order to obtain a desired stroke only with one rotation or 180° rotation of the pinion gear 75, the diameter D of the pinion gear 75 must be increased, and thus a thickness of the body, on which the pinion gear 75 is mounted, is also increased, thereby impeding miniaturization of the communication terminal.

Accordingly, a predetermined moved stroke can be ensured by increasing the number of rotations of the pinion gear 75, but in this case, there occurs a problem in that the manual operation cannot be smoothly performed.

Particularly, in such a conventional automatic slide type communication terminal, the rack gear 61 and the pinion gear 75 are provided as different modules, providing problems of a mesh disorder and a difficult assembly. Furthermore, a problem occurs in that not only an initial positioning of the first and second bodies, but also optimization of a sensor part is difficult.

In order to solve these problems, there is a need to provide a communication module, which has the slide type opening/closing means as a single module while allowing a smooth sliding operation.

SUMMARY OF THE INVENTION

The present invention has been made to solve the above problems, and it is an object of the present invention to provide a slide type communication terminal comprising a travel-enlarging member by which a smooth sliding operation can be completed even though a motor is rotated or 180° only.

It is another object of the present invention to provide a slide type communication terminal designed to smoothly slide, in which sliding operation can be completed by means of manual operation applying an external force to a main body just one time in such a way that the main body is pushed by a distance of a half or more of a sliding stroke.

It is yet another object of the present invention to provide a slide type communication terminal designed to allow a slide type opening/closing means to be provided as a single module so that it can be easily assembled to a main body and to provide a sensor part in the module so that it can be easily assembled.

In accordance with one aspect of the present invention, the above and other objects can be accomplished by the provision of a slide type communication terminal having a first body and a second body slidably moved on the first body, the communication terminal comprising: a driving unit including a motor for supplying a rotational drive force required for a sliding operation of the second body, and a rotatable pinion connected to the motor in an axial direction; a first hinge fixed at an underside to the first body, and including a rack gear meshed with the pinion to be linearly moved by the rotational drive force from the driving unit, and a travel-enlarging member connected to the rack gear to enlarge a travel distance of the second body; and a second hinge fixed at a top to the second body, and including a contact member protruded therefrom to contact the travel-enlarging member, wherein rotation of the pinion in response to the drive force of the driving unit is converted into a linear movement of the rack gear, and a distance of the linear movement of the rack gear is enlarged by means of the travel-enlarging member, so that the second body fixed to the second hinge is slid to an enlarged travel distance.

Preferably, the rack gear is provided to the underside of the first hinge such that the rack gear can be linearly moved by virtue of rotation of the driving unit in a state of being meshed with the pinion, and the travel-enlarging member comprises a rotatable lever, wherein the lever is rotated around a hinge shaft positioned on the first hinge by contact between a protrusion formed on a rear side of the rack gear opposite to a tooth array of the rack gear and a protrusion-receiving groove perforated through the lever corresponding to the protrusion to guide the protrusion according to the linear movement of the rack gear, and wherein as the lever is rotated, the second body fixed to the second hinge is slid by contact between the contact member of the second hinge and a guide groove perforated through the lever corresponding to the contact member to guide the contact member.

Preferably, a distance L2 from the hinge shaft to the contact member of the second hinge is larger than a distance L1 from the hinge shaft to the protrusion formed on the rack gear, and a ratio of the travel distance of the second hinge to the travel distance of the rack gear is enlarged by a ratio L2/L1 of the distance L2 from the hinge shaft to the contact member to the distance L1 from the hinge shaft to the protrusion.

Preferably, the driving unit further comprises a power transmission part connected to a rotational shaft of the motor in an axial direction to transmit or receive a drive force of the motor or an external force through a pair of members selectively meshed with each other by means of an elastic member, and the pinion is fixed to a rotational shaft of the power transmission part in an axial direction.

Preferably, the power transmission part comprises a hinge shaft fixed to the rotational shaft of the motor to transmit the drive force of the motor, a slide cam selectively meshed with the hinge shaft at every predetermined angle, and a guide cam relatively restricting the slide cam in a rotational direction while receiving the slide cam movably in an axial direction, the elastic member providing an elastic force to allow the hinge shaft and the slide cam to be selectively meshed with each other by means of the elastic member, the pair of members comprising the hinge shaft and the slide cam.

More preferably, the slide type communication terminal further comprises a sensor part including a contact-type sensor or a non-contact type sensor to detect rotation of a specific portion of the hinge shaft with respect to the motor by a predetermined angle; and a drive controller to control operation of the motor by means of a signal from the sensor part, whereby completion of the sliding operation is controlled.

BRIEF DESCRIPTION OF THE DRAWINGS

The foregoing and other objects and features of the present invention will be more clearly understood from the following detailed description taken in conjunction with the accompanying drawings, in which.

DESCRIPTION OF THE PREFERRED EMBODIMENTS

Preferred embodiments will now be described in detail with reference to the accompanying drawings.

Figure 1:
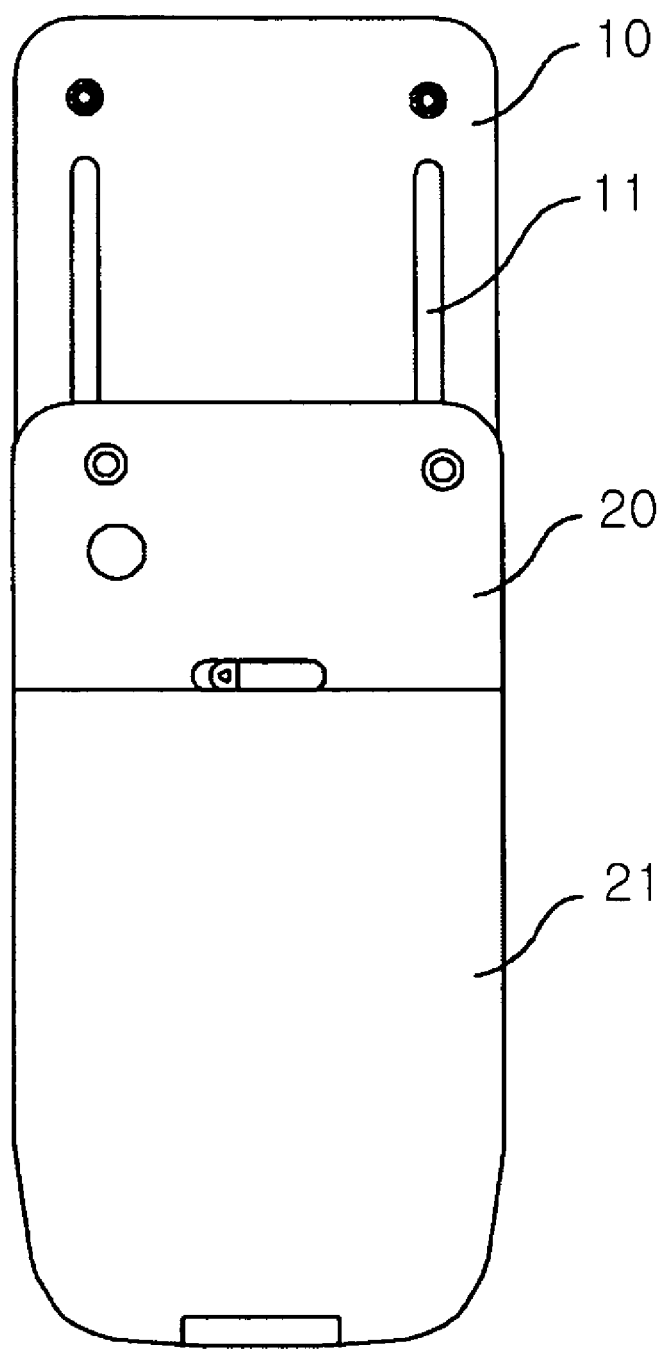
FIG. 1 is a schematic diagram illustrating a conventional slide type communication terminal.
Figure 2:
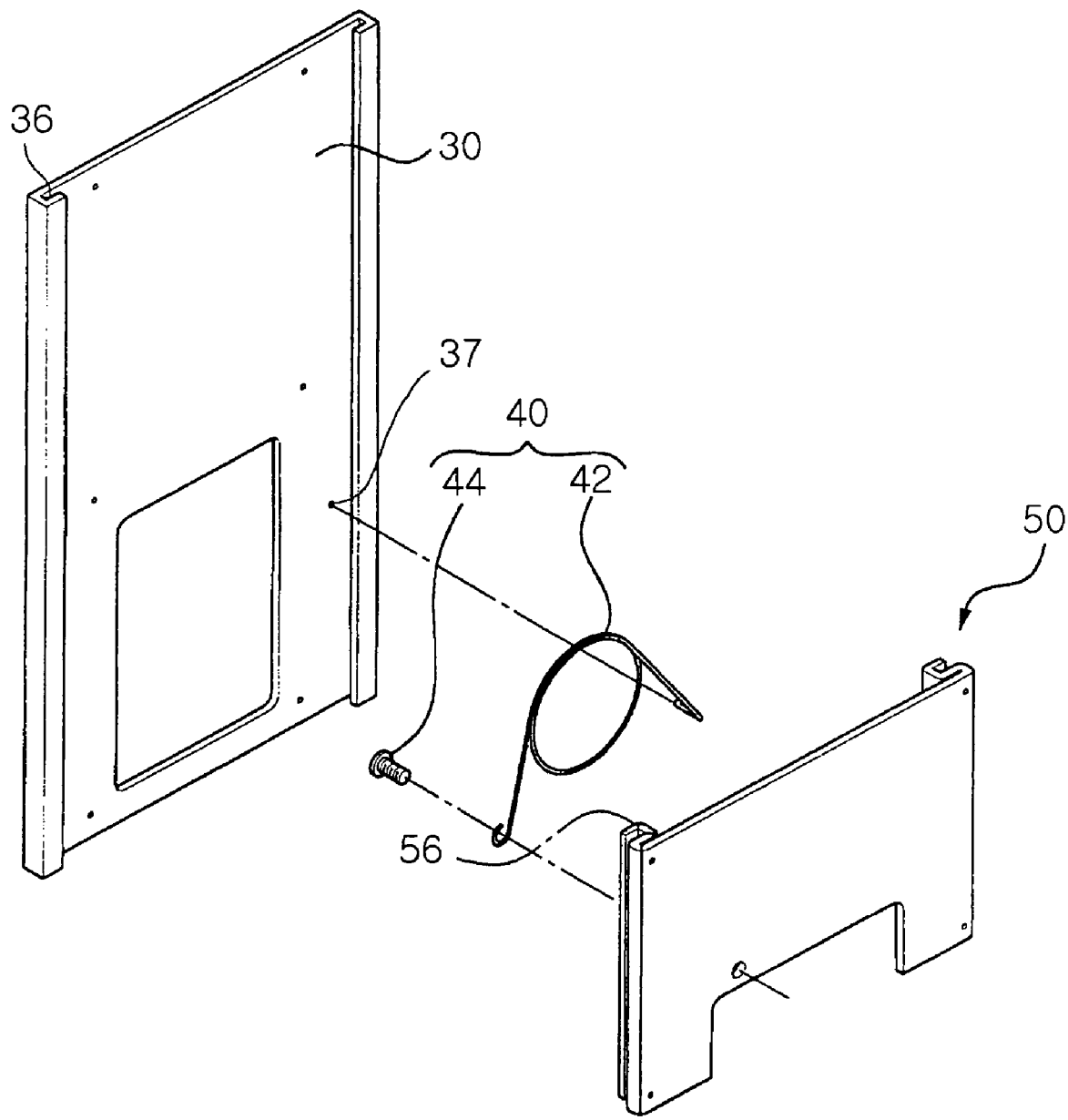
FIG. 2 is a schematic diagram illustrating a conventional manual slide type communication terminal.
Figure 3:
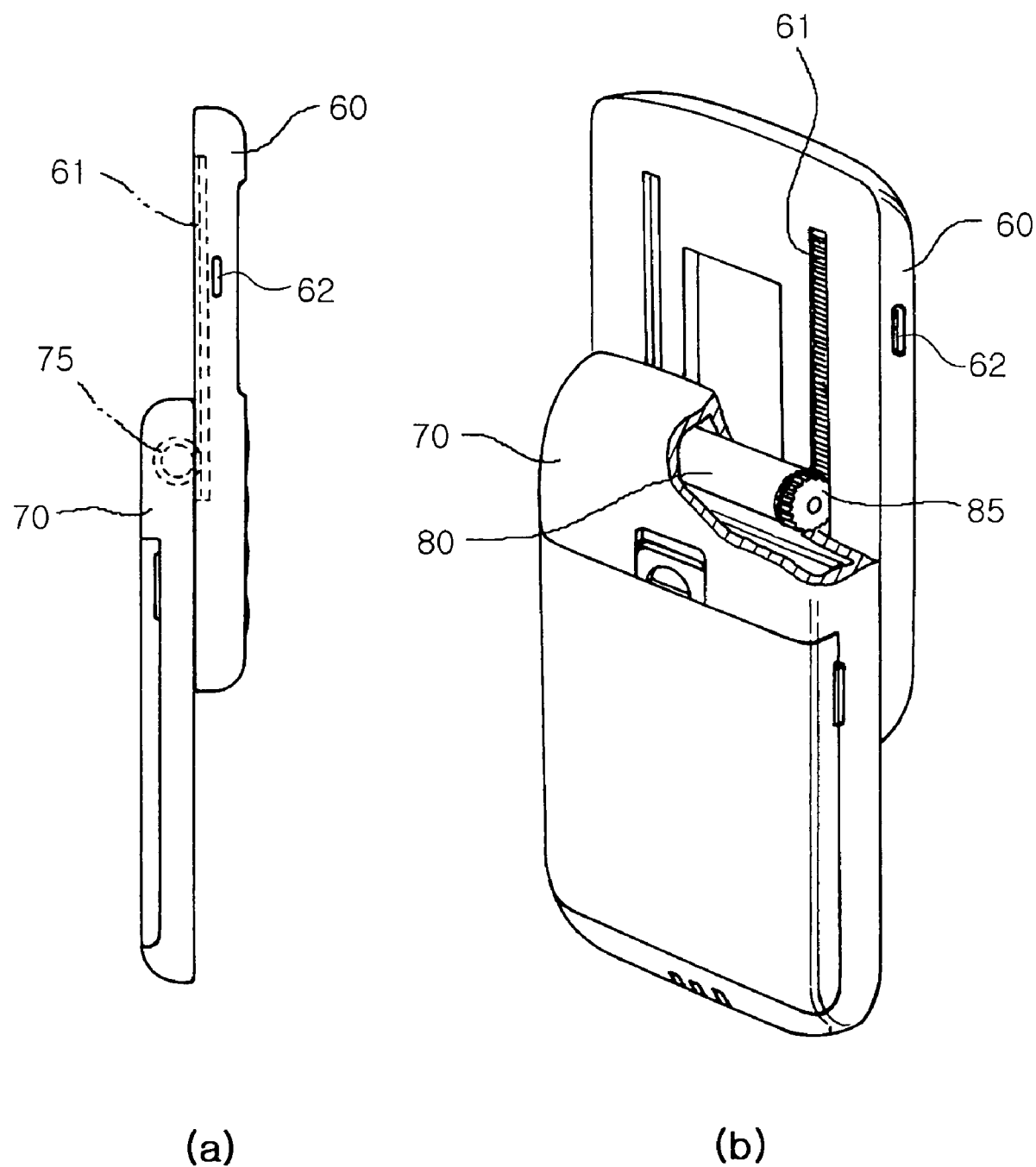
FIG. 3 is a schematic diagram illustrating a conventional automatic slide type communication terminal.
Figure 4:
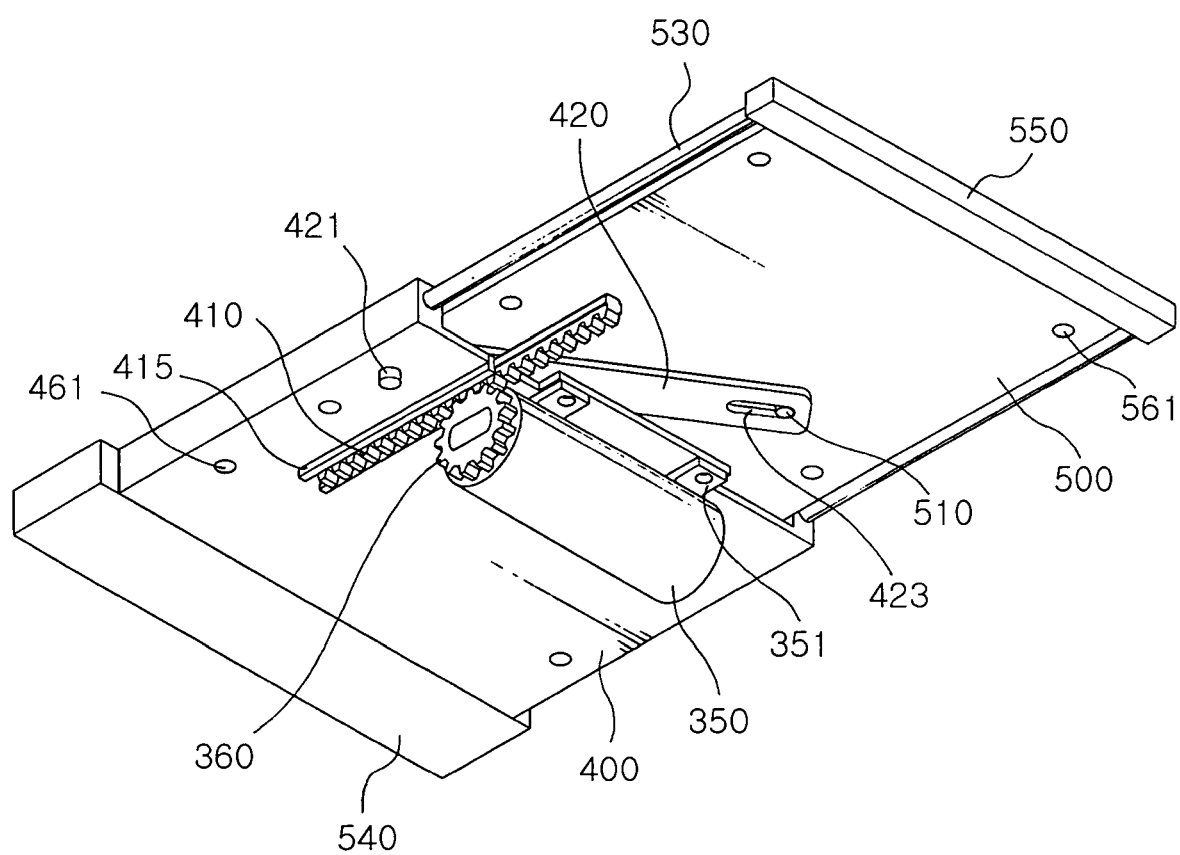
FIG. 4 is a perspective view illustrating a slide type communication terminal according to the present invention.
Figure 5A:
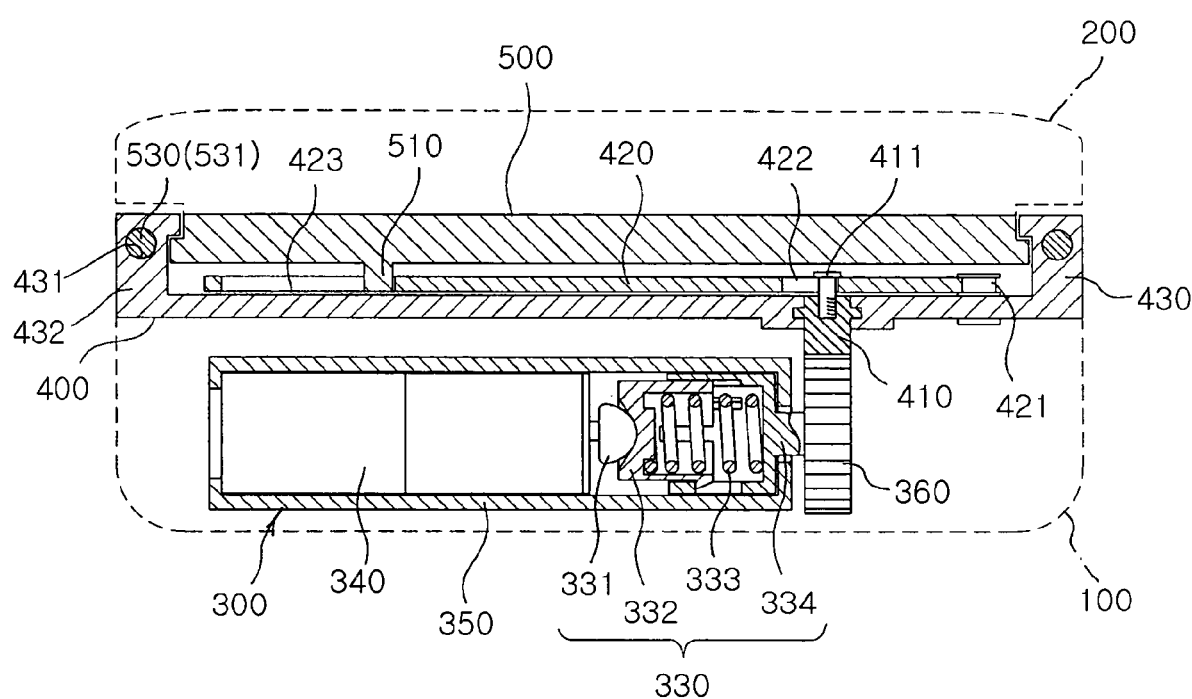
FIGS. 5*a*, 5*b*, and 5*c* are cross-sectional views illustrating an operational principle of the slide type communication terminal according to the present invention.
Figure 5B:
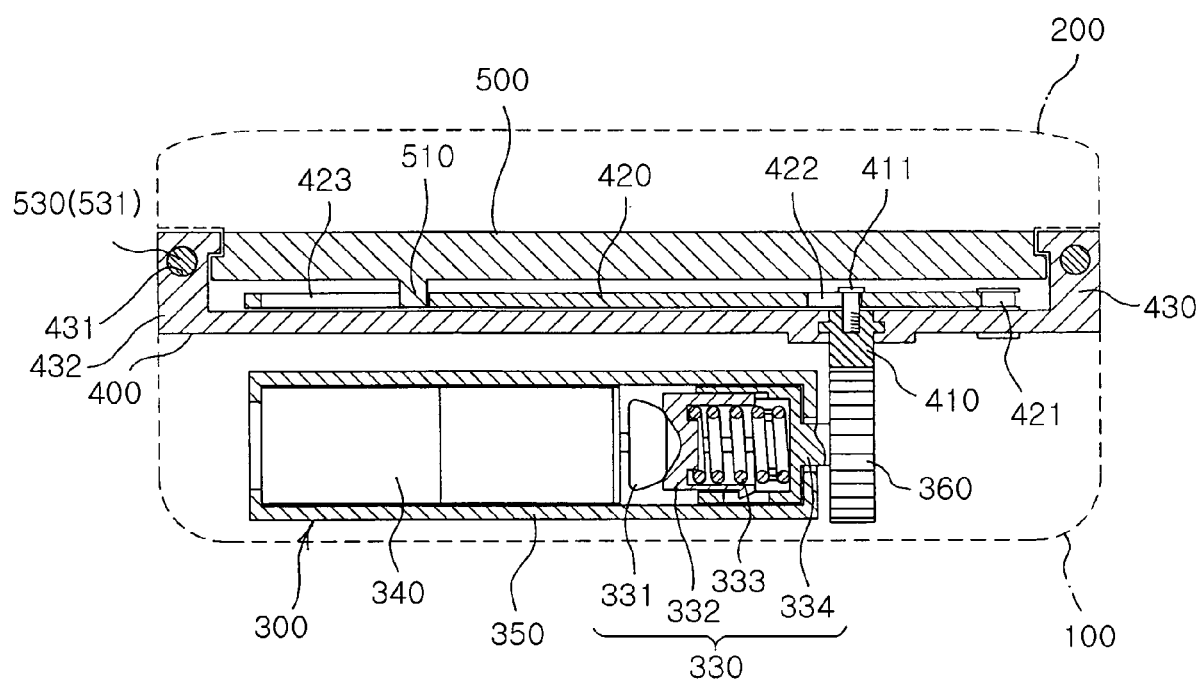
Figure 5C:
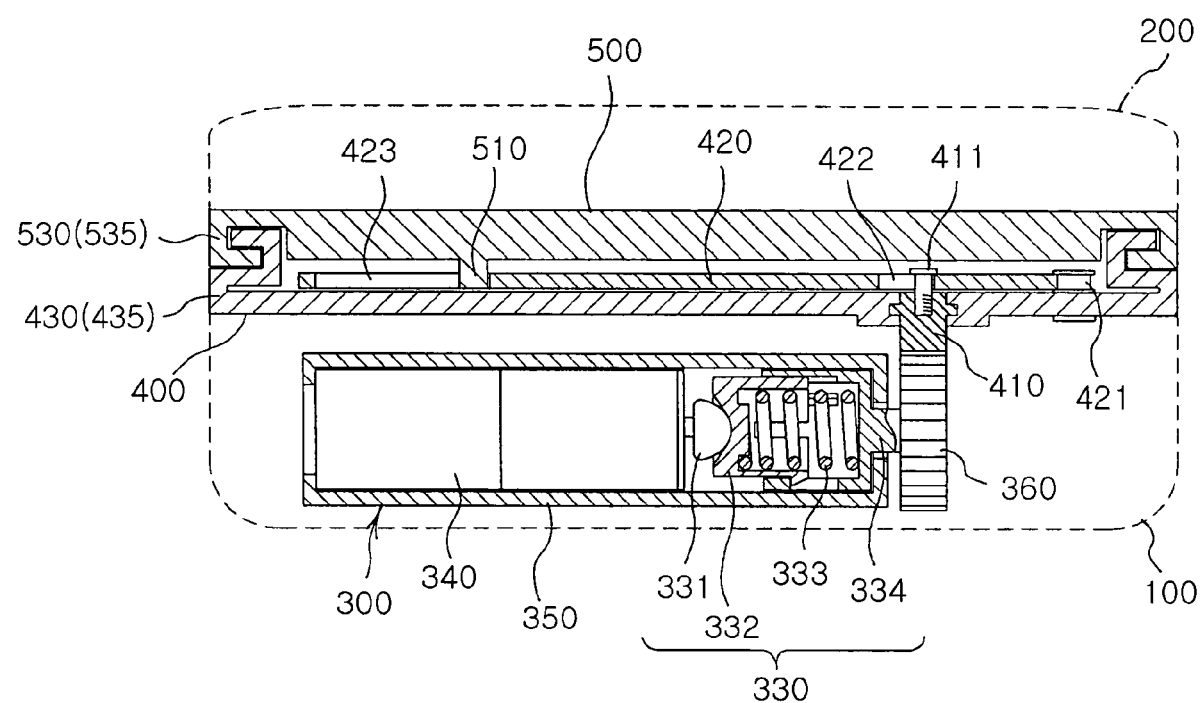
Figure 6:
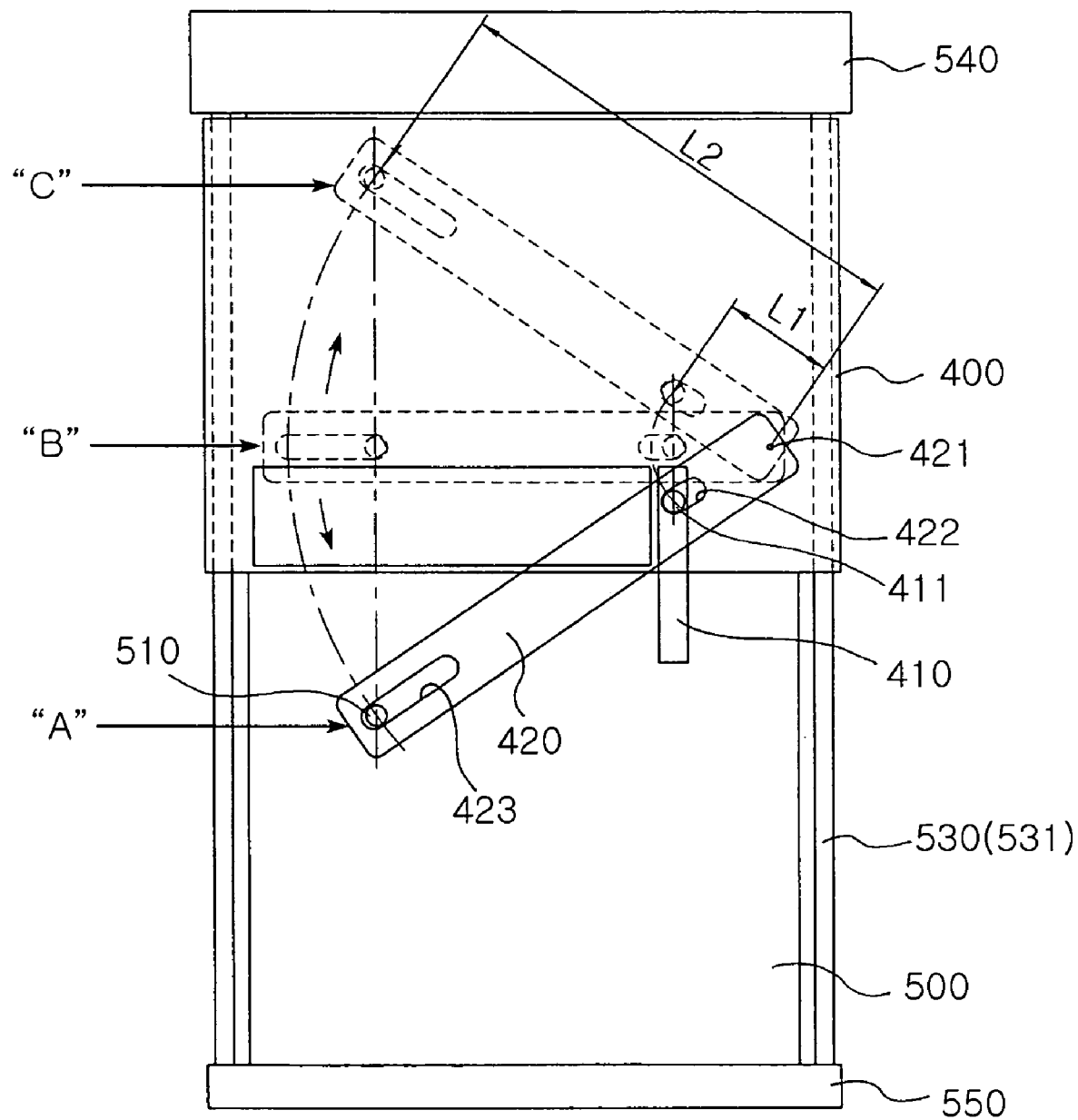
FIG. 6 is a diagram illustrating an operating state according to the operational principle of the slide type communication terminal according to the present invention.

FIG. 4 is a perspective view illustrating a slide type communication terminal according to the present invention, and FIGS. 5a, 5b, and 5c are cross-sectional views illustrating an operational principle of the slide type communication terminal according to the present invention. FIG. 6 is a diagram illustrating an operating state according to the operational principle of the slide type communication terminal according to the present invention.

Figure 7:
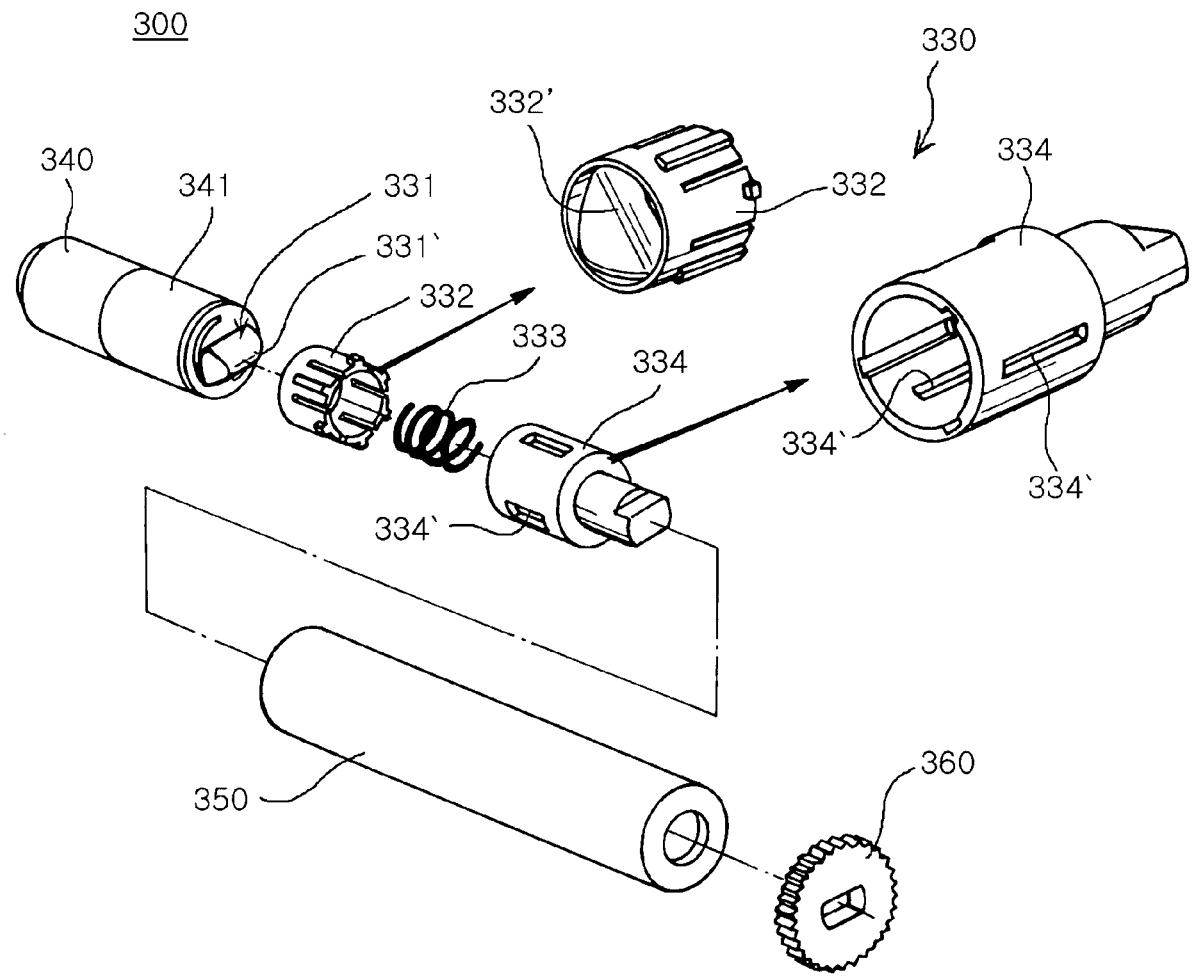
FIG. 7 is an exploded perspective view illustrating major components of a driving unit of the slide type communication terminal according to the present invention.

Additionally, FIG. 7 is an exploded perspective view illustrating major components of a driving unit of the slide type communication terminal according to the present invention.

Referring to FIGS. 4, 5a, 5b and 5c, a slide type communication terminal according to the present invention, comprises a first body 100, and a second body 200, which can be slidably moved on the first body 100. The slide type communication terminal of the present invention comprises a driving unit 300 having a motor 340 and a pinion 360, a first hinge 400 having a rack gear 410 and a travel-enlarging member 420, and a second hinge 500, wherein rotation of the pinion 360 applied to the driving unit 300 in response to a drive force of the driving unit 300 is converted to a linear movement of the rack gear 410 in the first hinge 400, and a distance of the linear movement of the rack gear 410 is enlarged by means of the travel-enlarging member 420, so that the second body 200 fixed to the second hinge 500 is slid by a distance corresponding to an enlarged travel distance.

As shown in FIG. 7, the driving unit 300 supplies the rotational drive force required for a sliding operation of the second body 200. The driving unit 300 includes a motor 340, and the pinion 360 connected to the motor 340 in an axial direction. The driving unit 300 preferably further includes a power transmission part 330.

The motor 340 acts to receive electric power from a battery provided in the communication terminal, and then to supply power for an automatic sliding operation.

Preferably, the motor 340 comprises a geared motor having a gear box 341 at an outlet of the motor. The gear box 341 may have a planetary gear type reducer having a predetermined reduction rate of approximately 300:1 or more for enlarging a driving torque, and simultaneously provides a function of speed reduction and a function of preventing reversion.

The pinion 360 can be directly connected to a rotational shaft of the motor and then rotated. Preferably, the pinion 360 is connected to the motor through the power transmission part 330 in order to realize a smooth manual sliding operation as described hereinafter.

The power transmission part 330 is connected to the motor 340 in an axial direction, and transmits or receives a drive force of the motor 340 or an external force through a pair of members selectively meshed with each other by means of an elastic member 333. In this case, the pinion 360 is fixed to a rotational shaft of the power transmission part 330 in an axial direction.

Referring to FIG. 7, the power transmission part 330 comprises a hinge shaft 331 fixed to the rotational shaft of the motor 340 to transmit the drive force of the motor 340, a slide cam 332 selectively meshed with the hinge shaft 331 at every predetermined angle, a guide cam 334 relatively restricting the slide cam 332 in a rotational direction while receiving the slide cam 332 in an axial direction to allow the slide cam 332 to be moved, and the elastic member 333 to provide an elastic force, which allows the hinge shaft 331 and the slide cam 332 to be selectively meshed with each other by means of the elastic member 333.

That is, the pair of members selectively meshed with each other by means of the elastic member 333 comprises the hinge shaft 331 and the slide cam 332.

Since the hinge shaft 331 is fixed to the rotational shaft of the motor 340, the hinge shaft 331 is rotated according to the drive of the motor 340.

The slide cam 332 is selectively meshed with the hinge shaft 331 by virtue of the elastic force of the elastic member 333.

Preferably, as shown in FIG. 7, the hinge shaft 331 is formed with a tapered protrusion 331', acting as a male cam, while the slide cam 332 is formed with a groove 332' corresponding to the protrusion 331' of the male cam, acting as a female cam. Additionally, as described hereinafter, since the sliding operation is completed by a 180° rotation of the hinge shaft 331, the hinge shaft 331 and the slide cam 332 are meshed with each other at every 180°.

On the contrary, the guide cam 332 may be formed as a male cam, and the hinge shaft 331 may be formed as a female cam.

The guide cam 334 relatively restricts the slide cam 332 in the rotational direction while receiving the slide cam 332 in an axial direction to allow the slide cam 332 to be moved.

That is, as shown in FIG. 7, the guide cam 334 is formed, on an outer peripheral surface of the guide cam 334, with key grooves 334', by which the slide cam 332 can be fixed into the guide cam 334 by way of a key coupling. As a result, the slide cam 332 can be rotated together with the guide cam 334 in a state of being fixed into the guide cam 334 in the rotational direction when the guide cam 334 is rotated, and can be moved by a length of the key grooves 334' in an axial direction.

The elastic member 333 acts to allow the slide cam 332 and the hinge shaft 331 to be selectively meshed with each other. That is, the elastic member 333 is positioned between the slide cam 332 and the guide cam 334, and acts to press the slide cam 332 towards the hinge shaft 331. For this purpose, the elastic member 333 is preferably a compression coil spring.

Preferably, the elastic member 333 is adapted to provide an elastic force larger than the drive force of the motor 340 and smaller than an external force. Thus, in the case of the automatic sliding operation, the elastic member 333 may be expanded, as shown in FIG. 5a, to allow the slide cam 332 and the hinge shaft 331 to be rotated in a meshed state, and in the case of the manual sliding by application of external force, the elastic member 333 may be compressed, as shown in FIG. 5b, to disengage the hinge shaft 331 from the slide cam 332, allowing the pinion 360 to be rotated by the external force.

Furthermore, preferably, the driving unit 300 further comprises a housing 350, which receives the power transmission part 330 and the motor 340 in such a way that an outer peripheral surface of the motor 340 is fixed to an inner peripheral surface of the housing 350.

At this time, as shown in FIG. 4, the housing 350 is fixed to the underside of the first hinge 400 through a connecting portion 351, and the pinion 360 is coupled to the power transmission part 330 through a penetration hole formed at one side of the housing 350.

Meanwhile, the underside of the first hinge 400 is fixed to the first body 100 through a plurality of mounting grooves 461 as shown in FIG. 4, and comprises the rack gear 410 and the travel-enlarging member 420.

The rack gear 410 is meshed with the pinion 360 of the driving unit 300, and is then linearly moved by virtue of the rotational drive force transmitted from the driving unit 300.

Preferably, the rack gear 410 is disposed to the underside of the first hinge 400 such that the rack gear 410 can be linearly moved by the rotation of the driving unit 300, and is guided by a rack guide member 415 fixed to the underside of the first hinge 400 such that the rack gear 410 can be moved in a straight line.

The travel-enlarging member 420 comprises a lever to rotate around a hinge shaft 421 positioned at the first hinge 400.

In response to a linear movement of the rack gear 410, the lever 420 contacts a protrusion 411 formed on the rear surface of the rack gear 410 opposite to a tooth array of the rack gear 410, and is then rotated centering on the hinge shaft 421. For this purpose, the lever 420 is formed with a protrusion-receiving groove 422 corresponding to the protrusion 411 in order to guide the protrusion 411 as shown in FIG. 6.

Furthermore, the second hinge 500 has an upper surface fixed to the second body 200 by means of a plurality of mounting grooves 561 shown in FIG. 4, and has a contact member 510 protruded on a underside of the second hinge 500 to contact the lever 420, which serves as the travel-enlarging member.

As the rack gear 410 is linearly moved, the lever 420 is rotated by virtue of contact guide between the protrusion 411 and the protrusion-receiving groove 422, and then contacts the contact member 510 protruded from the underside of the second hinge 500, so that the second body 200 fixed to the second hinge 500 is moved along with the second hinge 500.

That is, the lever 420 is formed with a guide groove 423 perforated through the lever 420 corresponding to the contact member 510 to guide the contact member 510, so that the second hinge 500 is moved by virtue of contact guide between the contact member 510 and the guide groove.

In order to move the second hinge 500 by enlarging the travel distance of the rack gear 410, the protrusion 411 is preferably positioned between the hinge shaft 421 and the contact member 510 on the lever 420, as shown in FIG. 6.

At this time, a distance L2 from the hinge shaft 421 to the contact member 510 formed on the underside of the second hinge 500 is preferably larger than a distance L1 from the hinge shaft 421 to the protrusion 411 formed on the rear surface of the rack gear 410, and as a result, the travel distance of the second hinge 500 to the travel distance of the rack gear 410 is enlarged by a ratio (L2/L1) of the distance L2 from the hinge shaft 421 to the contact member 510 to the distance L1 from the hinge shaft 421 to the protrusion 411.

For instance, in the case where the ratio between the distance L1 from the hinge shaft 421 to the protrusion 411 and the distance L2 from the hinge shaft 421 to the contact member 510 is 1:3, the travel distance of the second hinge 500 and the second body 200 fixed to the second hinge 500 is three times that of the travel distance of the rack gear 410.

Alternatively, when the hinge shaft 421 is positioned between the protrusion 411 and the contact member 510 on the lever the lever 420, the same effect as that of the case where the protrusion 411 is positioned between the hinge shaft 421 and the contact member 510 can be obtained.

Meanwhile, guide members may be formed on both sides of the first and second bodies 100 and 200 to guide the sliding operation of the first body 100 or the second body 200. Preferably, in order to provide the sliding means as a single module, the guide members are formed on both sides of the first hinge 400 and the second hinge 500.

That is, the first hinge 400 is additionally provided with first guide members 430 equipped on both sides of the first hinge 400 in a longitudinal direction, and the second hinge 500 is additionally provided with second guide members 530 equipped on both sides of the second hinge 500 corresponding to the first guide member 430. The first guide members 430 are fitted to the second guide members 530, so that the second hinge 500 is slid to the first hinge 400 while being guided in a longitudinal direction.

Preferably, as shown in FIGS. 5a and 5b, the second guide members 530 are provided as rod-shaped guide shafts 531 symmetrically equipped at both sides of the second hinge 500 in a longitudinal direction, and the first guide members 430 are provided as shaft supports each having a penetration hole 431 through which the guide shaft 531 is guided.

Preferably, as shown in FIG. 5c, the first guide members 430 are provided as guide grooves 435 symmetrically equipped at both sides of the first hinge 400 and bent in a longitudinal direction, and the second guide members 530 are provided as guide flanges 535, each corresponding to the first guide members 430, so that each of the guide flanges 535 can be inserted to each of the guide grooves 435 to move between the guide grooves in a longitudinal direction.

On the contrary, the first guide members 430 can be provided as the guide flanges, and the second guide members 530 can be provided as the guide grooves.

Meanwhile, the slide type communication terminal of the present invention may further comprise a drive controller, not shown, to control the motor according to a signal input to an opening/closing operation switch (not shown), by means of which an operational direction and operation of the motor are input.

The opening/closing operation switch is used for an automatic sliding operation to operating the driving means according to operation of the user, and is adapted to output a predetermined electrical signal to the motor 340 by operation of the switch. Although the opening/closing operation switch may be typically provided as an on/off switch at one side of the body, it may be provided as various shapes according to the shape of the communication terminal or at a location allowing easy operation.

Figure 8:
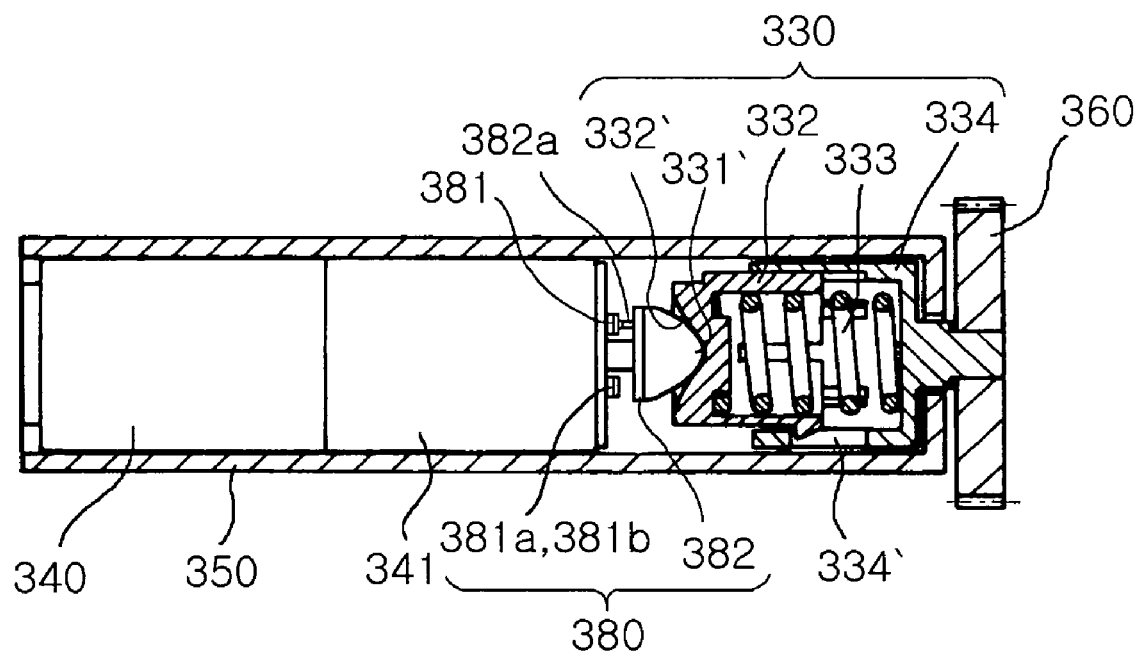
FIGS. 8a and 8b are sectional side elevations illustrating a sensor part mounted in the slide type communication terminal according to the present invention.
Figure 8:
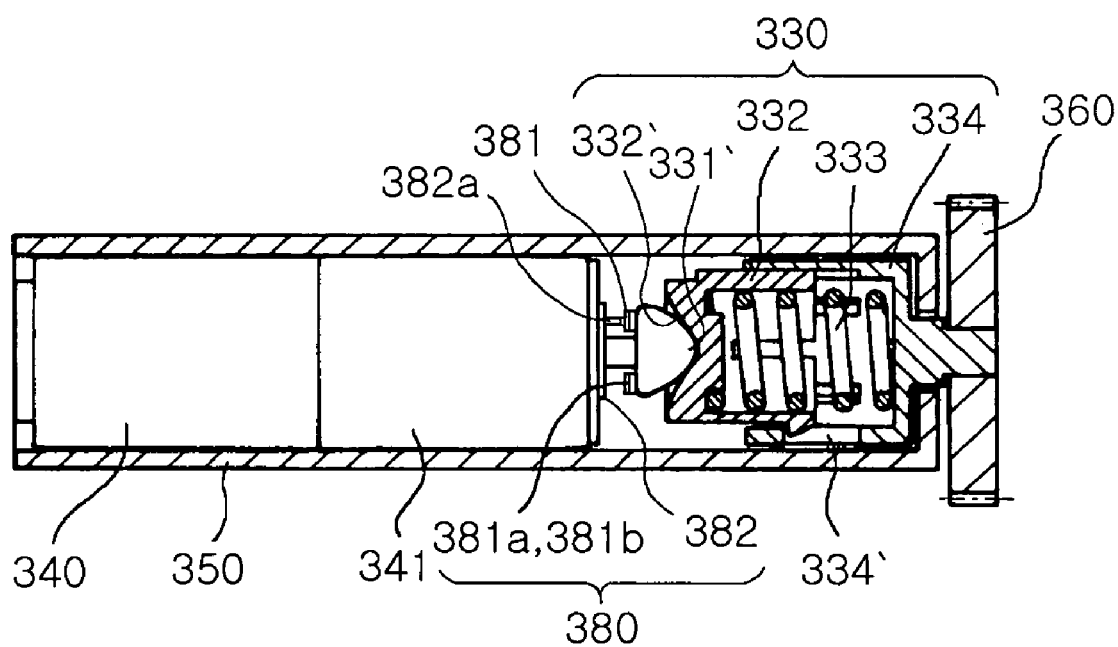
Figure 9:
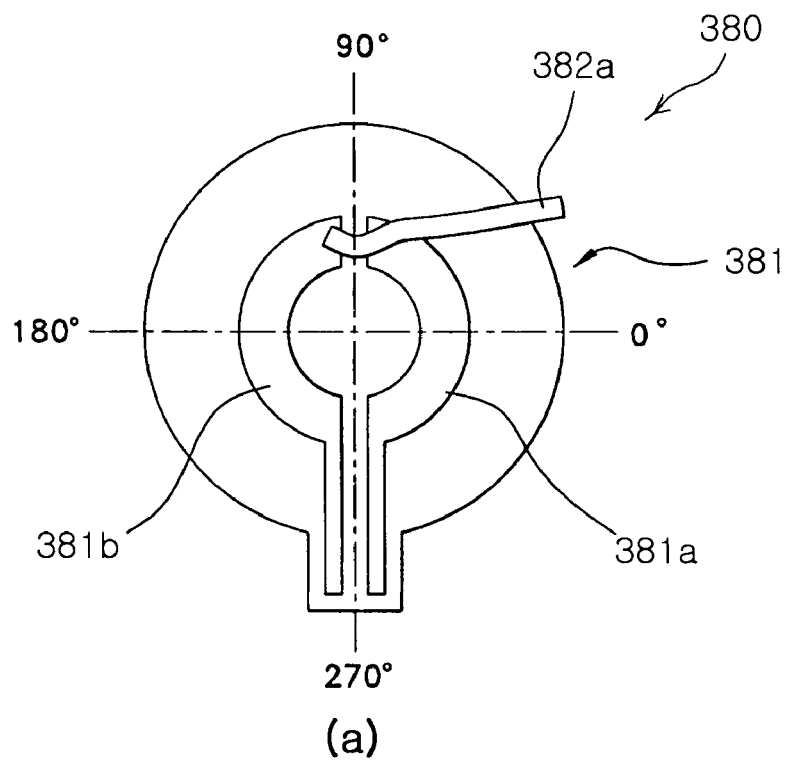
FIGS. 9a and 9b are schematic diagrams illustrating one embodiment of a brush housing and a rectifying housing of the sensor part shown in FIGS. 8a and 8b.
Figure 9:
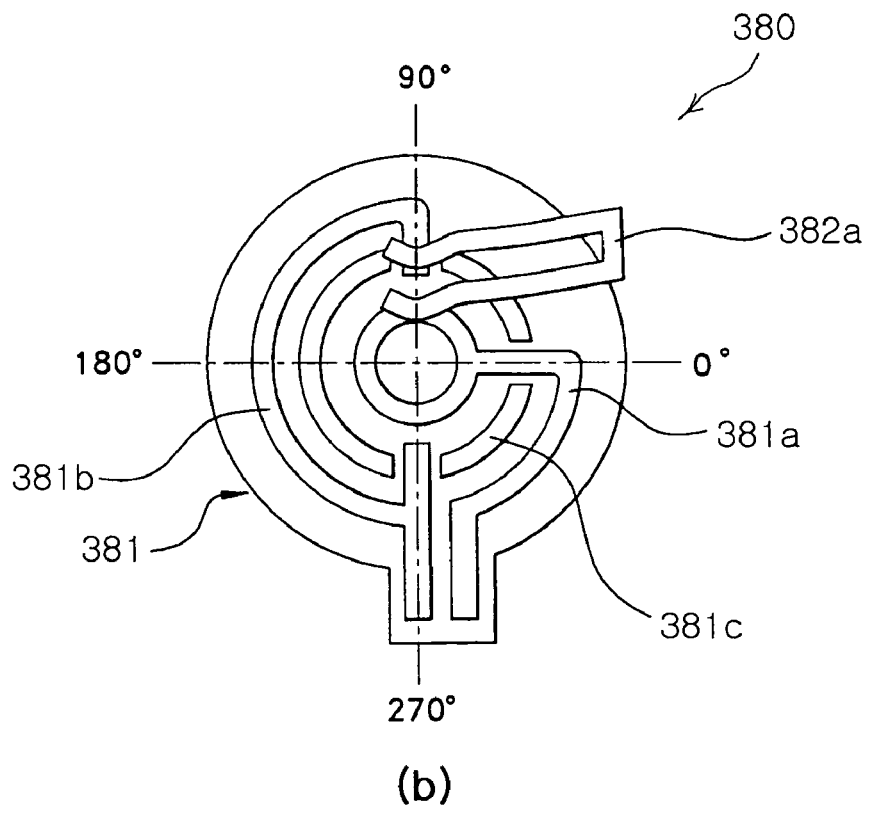

FIGS. 8a and 8b are sectional side elevations illustrating a sensor part mounted in the slide type communication terminal according to the present invention, and FIGS. 9a and 9b are schematic diagrams illustrating one embodiment of a brush housing and a rectifying housing of the sensor part shown in FIGS. 8a and 8b.

As shown in FIGS. 8a and 8b, in order to control smooth completion of the sliding operation of the second body 100, the slide type communication terminal of the present invention may further comprise a sensor part 380 having a contact-type sensor or a non-contact type sensor to detect rotation of a specific portion of the hinge shaft 331 to the motor 340 by a predetermined angle, and the drive controller described above controls driving of the motor 340 by means of the signal from the sensor part 380.

Preferably, in the case where the sensor part 380 has the contact type sensor, as shown in FIGS. 8a, 8b, 9a and 9b, the sensor part comprises a brush housing 382 having at least one brush 382a protruded from the brush housing 382, and a rectifying housing 381 having a first pattern 381a and a second pattern 381 separated from each other such that electric current can flow at every predetermined angle through an electrical contact between the brush 382a and the first pattern 381a or the second pattern 381b. Accordingly, as the brush housing 382 and the rectifying housing 381 are rotated relative to each other by virtue of the rotation of the motor 340, a drive stop signal is applied to the drive controller (not shown) when the brush 382a of the brush housing 382 is electrically connected to the first pattern 381a or the second pattern 381b of the rectifying housing 381 at every predetermined angle, allowing the electric current to flow between the brush 382a and the first pattern 381a or the second pattern 381b.

That is, in the case of using the hinge shaft 331 and the slide cam 332, which are meshed with each other every 180°, the brush housing and the rectifying housing may be shaped to generate the drive stop signal by virtue of 180° rotation of the motor.

The shape of the first and second patterns 381a and 381b, and the number of brushes 382a may be variously determined to allow the electric current to flow every desired angle. That is, if the first and second patterns 381a and 381b are electrically connected to the brush at a phase of 360°, two brushes are utilized to allow the electric current to flow every 180°.

Alternatively, in the case where the sensor part 380 has the non-contact type sensor, the sensor part is constructed similar to the case of the contact type sensor described above.

That is, the sensor part 380 comprises a detection sensor, which can be switched when sensing a magnetic field, and a magnet equipped corresponding to the detection sensor to generate the magnetic field. In such a construction, as the detection sensor and the magnet are rotated relative to each other by virtue of the rotation of the motor 340, even if the detection sensor does not contact the magnet, the drive stop signal can be applied to the drive controller when the detection sensor is switched at every predetermined angle (180°) in a state of facing the magnet.

Here, as for the detection sensor, various kinds of sensors, including a hall sensor consisting of Hall ICs, a sensor using a magnetic resistance effect device (MR device), and the like, can be used.

As shown in FIGS. 8a and 8b, such a contact type sensor or a non-contact type sensor may be equipped to one side of the motor 340 and to one end of the hinge shaft 331 opposite to the one side of the motor 340. Alternatively, a contact type sensor or a non-contact type sensor may be equipped to a protruding surface of the hinge shaft 331 and to an inner surface of the housing opposite to the protruding surface of the hinge shaft 331.

As such, as the sliding means is provided as the single module, it can be easily assembled to the main body, and as the sensor part is provided in the module, an effective sensor structure and enhanced assembly of the sensor can be achieved.

The slide type communication terminal having the construction as described above can automatically or manually be operated.

An automatic sliding operation of the slide type communication terminal according to the present invention will now be described with reference to FIGS. 4 and 6.

When a user presses an opening/closing operation switch (not shown) in a closed state of the second body 200, the drive controller (not shown) drives the motor 340 to open the second body according to a signal input from the switch after determining whether the second body 200 is open or closed. Of course, in the state that the second body 200 is open, the automatic sliding operation will be conducted to close the second body 200.

Determination of such an open state or a closed state of the second body 200 can be recognized by means of a circuit embedded in the terminal. For instance, a circuit to light an LCD when opening an upper side slide and to extinguish the LCD when closing the upper side slide can be used.

As shown in FIG. 5a, as the motor 340 is driven, the hinge shaft 331 connected to the rotational shaft of the motor 340 is also rotated, and rotation of the hinge shaft 331 causes the slide cam 332 meshed with the hinge shaft 331 by means of the elastic member 333 to rotate. That is, the protrusion 331' of the hinge shaft 331 and a recess 332' of the slide cam 332 are meshed with each other, and thus the hinge shaft 331 and the slide cam 332 are rotated together.

Then, the guide cam 334 having the slide cam 332 fixed into the guide cam 334 by means of the key coupling is rotated, and thus, the pinion 360 is rotated together with the guide cam 334.

As a result, as the pinion 360 is rotated, the rack gear 410 meshed with the pinion 360 is linearly moved. Then, the protrusion 411 formed on the rear side of the rack gear 410 opposite to the teeth array of the rack 410 contacts the protrusion-receiving groove 422 perforated through the lever 420, and rotates the lever 420 around the hinge shaft 421 of the first hinge 400.

Referring to FIG. 6, a position of the lever 420 indicated by "A" shown in FIG. 6 indicates a completely closed state of the second body 200, and in this state, when the user presses the opening/closing operation switch, the protrusion 411 contacts the protrusion-receiving groove 422, and rotates the lever 420 in a direction indicated by "B" shown in FIG. 6.

At this time, rotation of the lever 420 mounted on the first hinge 400 causes the guide groove 423 of the lever 420 to push the contact member 510 protruded from the underside of the second hinge 500, and thus, the second hinge 500 and the second body 200 fixed to the second hinge 500 are slid to open a predetermined region of the terminal.

Meanwhile, as shown in FIGS. 8a and 8b, when rotation of a predetermined angle (in the case where the hinge shaft and the slide cam are meshed every 180°, the predetermined angle is 180°) is detected by the sensor part 380, which can detect a relative rotation between the hinge shaft 331 and the motor 340, a drive stop signal is applied to the drive controller (not shown), and the lever 420 is rotated to a completely open position indicated by "C" in FIG. 6, completing the sliding operation of the second body 200.

Since the sliding operation of the second body 200 is completed with such a sensor part 380 when the power transmission part 330 is rotated by 180°, the phase state of the power transmission part 330 in the automatic sliding operation is maintained to correspond to that of the power transmission part 330 in the manual sliding operation described below, thereby enabling automatic and manual sliding operations to be stably conducted.

Meanwhile, the automatic sliding operation of the second body from the open state to the closed state is also conducted by the principle as described above.

A manual sliding operation of the slide type communication terminal according to the present invention will now be described with reference to FIGS. 4 and 6.

For instance, when the user pushes the second body 200 in a direction indicated by "C" shown in FIG. 6 to open the second body 200 in the closed state of the second body 200 indicated by "A" in FIG. 6, the contact member 510 protruded from the underside of the second hinge 500 pushes the guide groove 423 of the lever 420 upward, and thus, the lever 420 is moved to the position indicated by "B" in FIG. 6.

At this time, the rotation of the lever 420 causes the protrusion-receiving groove 422 to push the protrusion 411 of the rack gear 410 upward, and as the rack gear 411 is moved upward, an external force applied to the rack gear 411 is transmitted to the power transmission part 330 through the pinion 360.

Meanwhile, since the motor 340 comprises a geared motor, the motor 340 cannot be rotated itself if the motor 340 is not driven. Accordingly, when the external force is applied to the elastic member 333, the elastic member 333 is compressed and allows the hinge shaft 331 and the slide cam 332 to be separated from each other, bringing the pinion 360 into a rotatable state.

Accordingly, the rack gear 410 can be linearly moved upward by virtue of the external force, and the lever 420 can be rotated.

Meanwhile, in the position indicated by "B" in FIG. 6, a positional deviation between the hinge shaft 331 and the slide cam 332 is the highest at an angle of 90° therebetween, and after this position, the sliding operation to open the second body 200 fixed to the second hinge 500 is completed by virtue of the elastic force applied from the elastic member 333 without additional external force.

If the external force is removed before the lever 420 reaches the position indicated by "B" in FIG. 6, the second body 200 returns to a closed position by virtue of the elastic force of the elastic member 333.

That is, when the positional deviation between the hinge shaft 331 and the slide cam 332 is lowered below the angle of 90°, the second body 200 returns to an initial position, that is, the closed position, by virtue of the elastic force of the elastic member 333. When the positional deviation between the hinge shaft 331 and the slide cam 332 is increased above the angle of 90°, the second body 200 is moved to a completely open state by virtue of the elastic force of the elastic member 333.

According to the present invention, by means of the travel-enlarging member 420, the manual sliding operation for completely opening or closing the second body with one time application of external force can be more easily and smoothly conducted than in the conventional slide type communication terminal, and the sliding operation can be conducted with a small force by means of the lever rule.

As described above, the slide type communication terminal according to the present invention allows the manual sliding operation to be conducted, and has an advantage in that, compared with the conventional slide type communication terminal, the terminal can be more easily and smoothly opened or closed by means of the lever 420 acting as the travel-enlarging member and of the power transmission part 300 including the elastic member 333 and the pair of members 331 and 332 meshed with each other.

As is apparent from the description, the slide type communication terminal according to the present invention has an advantageous effect in that smooth automatic and manual sliding operations can be conducted through the travel-enlarging member and through the power transmission part including the elastic member and the pair of members meshed with each other.

Furthermore, there is another advantageous effect in that in the case of the automatic operation, the sliding operation can be completed only with 180° rotation of the motor part through the travel-enlarging member, and in the case of the manual operation, the sliding operation can be completed with the one time application of external force by pushing the second body by a distance of a half or more of the sliding stroke.

Furthermore, there is yet another advantageous effect in that the slide type opening/closing means can be easily assembled to the main body by manufacturing the slide type opening/closing means as the single module and providing the module with the sensor part therein.

It should be understood that the embodiments and the accompanying drawings as described above have been described for illustrative purposes and the present invention is limited only by the following claims. Further, those skilled in the art will appreciate that various modifications, additions and substitutions are allowed without departing from the scope and spirit of the invention as set forth in the accompanying claims.

What is claimed is:

1. A slide type communication terminal having a first body and a second body slidably moved on the first body, the communication terminal comprising:
   a driving unit including a motor for supplying a rotational drive force required for a sliding operation of the second body, and a rotatable pinion connected to the motor in an axial direction;
   a first hinge fixed at an underside to the first body, and including a rack gear meshed with the pinion to be linearly moved by the rotational drive force from the driving unit, and a travel-enlarging member connected to the rack gear to enlarge a travel distance of the second body; and
   a second hinge fixed at a top to the second body, and including a contact member protruded therefrom to contact the travel-enlarging member,
   wherein rotation of the pinion in response to the drive force of the driving unit is converted into a linear movement of the rack gear, and a distance of the linear movement of the rack gear is enlarged by means of the travel-enlarging member, so that the second body fixed to the second hinge is slid to an enlarged travel distance.

2. The communication terminal as set forth in claim 1, wherein the rack gear is provided to the underside of the first hinge such that the rack gear can be linearly moved by virtue of rotation of the driving unit in a state of being meshed with the pinion, and the travel-enlarging member comprises a rotatable lever, wherein the lever is rotated around a hinge shaft positioned on the first hinge by contact between a protrusion formed on a rear side of the rack gear opposite to a tooth array of the rack gear and a protrusion-receiving groove perforated through the lever corresponding to the protrusion to guide the protrusion according to the linear movement of the rack gear, and
   wherein as the lever is rotated, the second body fixed to the second hinge is slid by contact between the contact member of the second hinge and a guide groove perforated through the lever corresponding to the contact member to guide the contact member.

3. The communication terminal as set forth in claim 2, wherein a distance L2 from the hinge shaft to the contact member of the second hinge is larger than a distance L1 from the hinge shaft to the protrusion formed on the rack gear, and a ratio of the travel distance of the second hinge to the travel distance of the rack gear is enlarged by a ratio L2/L1 of the distance L2 from the hinge shaft to the contact member to the distance L1 from the hinge shaft to the protrusion.

4. The communication terminal as set forth in claim 3, wherein the protrusion is positioned between the hinge shaft and the contact member on the lever.

5. The communication terminal as set forth in claim 3, wherein the hinge shaft is positioned between the protrusion and the contact member on the lever.

6. The communication terminal as set forth in claim 2, wherein the first hinge further comprises a rack guide member for guiding the rack gear in a straight line.

7. The communication terminal as set forth in claim 1, wherein the first hinge further comprises first guide members disposed on both sides of the first hinge in a longitudinal direction, and the second hinge further comprises second guide members each disposed on both sides of the second hinge corresponding to each of the first guide members, each of the first guide members being inserted into each of the second guide members, so that the second hinge is slid while being guided with respect to the first hinge in a longitudinal direction.

8. The communication terminal as set forth in claim 7, wherein the second guide members are provided as rod-shaped guide shafts symmetrically disposed at both sides of the second hinge in a longitudinal direction, and the first guide members are provided as shaft supports, each having a penetration hole through which the guide shaft is guided.

9. The communication terminal as set forth in claim 7, wherein the first guide members are provided as guide grooves or guide flanges symmetrically disposed at both sides of the first hinge and bent in a longitudinal direction, and the second guide members are provided as guide flanges or guide grooves formed to correspond to the first guide members, so that each of the guide flanges can be inserted to each of the guide grooves to move between the guide grooves in a longitudinal direction.

10. The communication terminal as set forth in claim 1, wherein the driving unit further comprises a power transmission part connected to a rotational shaft of the motor in an axial direction to transmit or receive a drive force of the motor or an external force through a pair of members selectively meshed with each other by means of an elastic member, and the pinion is fixed to a rotational shaft of the power transmission part in an axial direction.

11. The communication terminal as set forth in claim 10, wherein the driving unit further comprises a housing for receiving the power transmission part and the motor in such a way that an outer peripheral surface of the motor is fixed to an inner peripheral surface of the housing, the housing being fixed to a underside of the first hinge and having a penetration hole formed at one side of the housing, and the pinion is fixed to the power transmission part through the penetration hole of the housing.

12. The communication terminal as set forth in claim 1, wherein the motor comprises a geared motor having a gear box for enlarging a driving torque.

13. The communication terminal as set forth in claim 10, wherein the power transmission part comprises a hinge shaft fixed to the rotational shaft of the motor to transmit the drive force of the motor, a slide cam selectively meshed with the hinge shaft at every predetermined angle, and a guide cam relatively restricting the slide cam in a rotational direction while receiving the slide cam movably in an axial direction, the elastic member providing an elastic force to allow the hinge shaft and the slide cam to be selectively meshed with each other by means of the elastic member, the pair of members comprising the hinge shaft and the slide cam.

14. The communication terminal as set forth in claim 13, wherein the hinge shaft has a tapered protrusion, acting as a male cam, and the slide cam has a groove corresponding to the protrusion of the male cam, acting as a female cam, the hinge shaft and the slide cam are meshed with each other every 180°.

15. The communication terminal as set forth in claim 13, wherein the elastic member is positioned between the slide cam and the guide cam, and presses the slide cam towards the hinge shaft.

16. The communication terminal as set forth in claim 15, wherein the elastic member is adapted to provide an elastic force larger than the drive force of the motor and smaller than an external force, so that in a case of an automatic sliding operation, the elastic member may be expanded, allowing the slide cam and the hinge shaft to be rotated in a meshed state, and in a case of a manual sliding operation by application of external force, the elastic member may be compressed to disengage the hinge shaft from the slide cam, allowing the pinion to be rotated by the external force.

17. The communication terminal as set forth in claim 13, further comprising:
    a sensor part including a contact-type sensor or a non-contact type sensor to detect rotation of a specific portion of the hinge shaft with respect to the motor by a predetermined angle; and
    a drive controller to control operation of the motor by means of a signal from the sensor part, whereby completion of the sliding operation is controlled.

18. The communication terminal as set forth in claim 17, wherein the sensor part comprises a brush housing having at least one brush protruded from the brush housing, and a rectifying housing having a first pattern and a second pattern separated from each other such that electric current can flow at every predetermined angle through electrical contact between the brush and the first or second pattern, and
    wherein the brush housing and the rectifying housing are rotated relative to each other by virtue of the rotation of the motor, so that a drive stop signal is applied to the drive controller, whenever the brush of the brush housing is electrically connected to the first pattern or the second pattern of the rectifying housing at every predetermined angle to allow the electric current to flow between the brush and the first pattern or the second pattern.

19. The communication terminal as set forth in claim 17, wherein the sensor part comprises a detection sensor for switching when sensing a magnetic field, and a magnet disposed corresponding to the detection sensor to generate the magnetic field, and
    wherein the detection sensor and the magnet are rotated relative to each other by virtue of the rotation of the motor, so that a drive stop signal is applied to the drive controller when the detection sensor is switched at every predetermined angle to face the magnet even if the detection sensor does not contact the magnet.

* * * * *